(No Model.) 2 Sheets—Sheet 1.

J. GRIEB.
CHEESE BOX.

No. 463,189. Patented Nov. 17, 1891.

WITNESSES
H. W. Plaisted
J. C. Dawley

INVENTOR
Joseph Grieb
By H. A. Toulmin
his Attorney.

(No Model.) 2 Sheets—Sheet 2.
J. GRIEB.
CHEESE BOX.
No. 463,189. Patented Nov. 17, 1891.
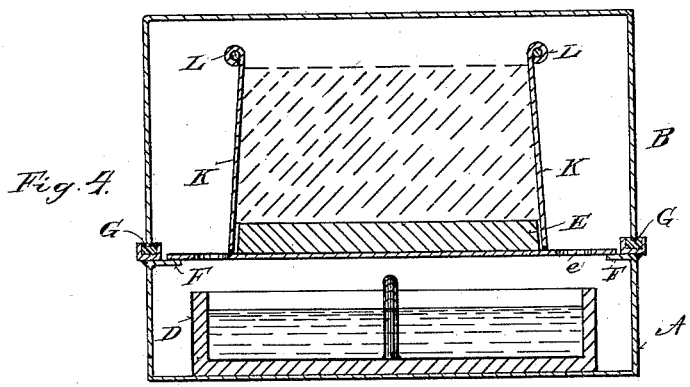
Fig. 4.
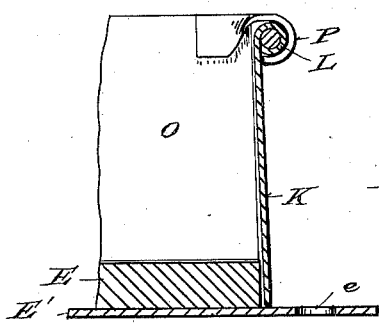
Fig. 5.
Fig. 6.
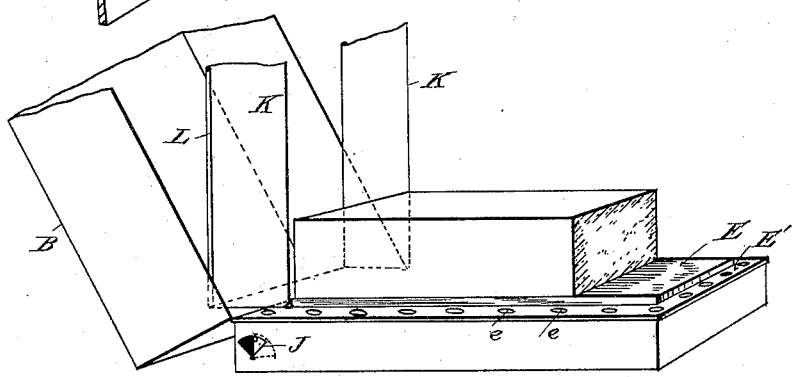
Fig. 7.
WITNESSES
H. M. Plaisted
J. C. Dawley
INVENTOR
Joseph Grieb
By H. A. Toulmin
His Attorney.

UNITED STATES PATENT OFFICE.

JOSEPH GRIEB, OF SPRINGFIELD, OHIO.

CHEESE-BOX.

SPECIFICATION forming part of Letters Patent No. 463,189, dated November 17, 1891.

Application filed June 4, 1891. Serial No. 395,062. (No model.)

*To all whom it may concern:*

Be it known that I, JOSEPH GRIEB, a citizen of the United States, residing at Springfield, in the county of Clark and State of Ohio, have invented certain new and useful Improvements in Cheese-Boxes, of which the following is a specification, reference being had therein to the accompanying drawings.

This invention relates to certain new and useful improvements in cheese-boxes.

The object of this invention is to provide a receptacle adapted to cool, preserve, and moisten the cheese placed therein; and with this object in view my improvements have reference to a vessel for a cooling-mixture, a cheese-support, and an inclosing case; to a cutting-board and a perforated plate therefor; to a former or side support for the softer makes of cheese and an adjustable partition or stop-plate therefor, and to other points of detail hereinafter described and claimed.

Figure 1:
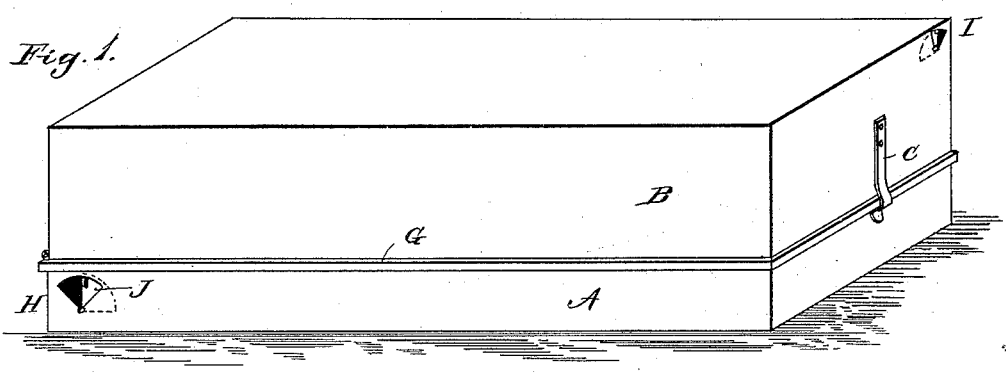
Figure 2:
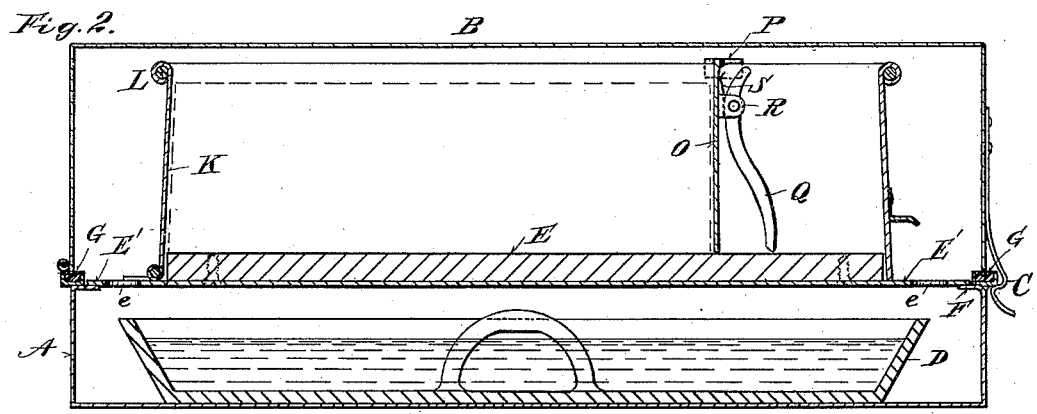
Figure 3:
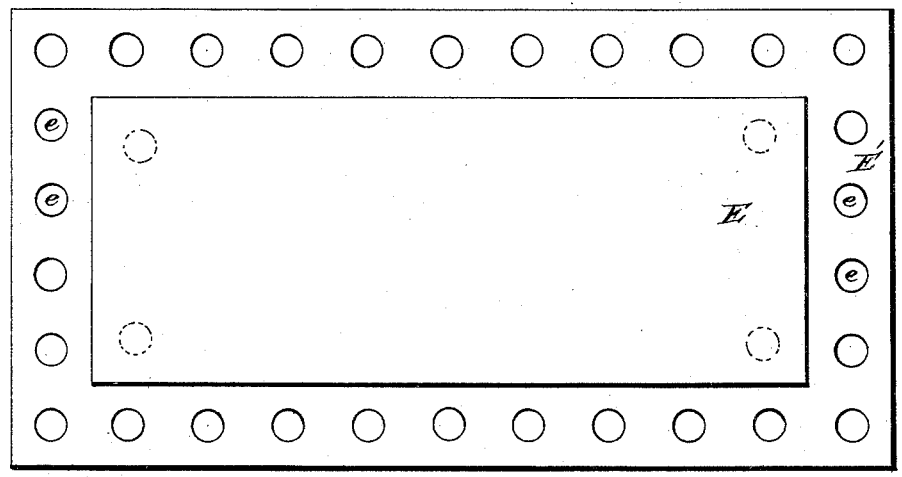

In the accompanying drawings, forming a part of this specification, and on which like reference-letters indicate corresponding parts, Figure 1 represents a perspective view of my device closed; Fig. 2, a longitudinal sectional view thereof; Fig. 3, a detached plan view of the cheese-board and plate; Fig. 4, a transverse sectional view similar to Fig. 2; Fig. 5, a perspective view of a portion of the adjustable stop-plate; Fig. 6, a sectional view of the cheese-board and former, showing the manner of mounting the stop-plate thereon; and Fig. 7, a perspective view showing the parts open to give access to the cheese.

As is well known, the freshly-cut surface of cheese hardens and dries by exposure to the air. The hardened surface is often cut away to obtain the fresh moist cheese for table or other use. The resulting loss is often considerable. My device is adapted to overcome these disadvantages by keeping the cheese cool, preserving the same from deterioration, and moistening it to prevent drying, as above described.

The device is especially adapted for use in restaurants or private houses, where it is desired to have frequent access to the cheese and also preserve it in its fresh condition for any convenient length of time.

Referring to the drawings, the letter A designates the bottom of the receptacle, provided with the cover B, hinged or otherwise adapted to be used therewith, and provided with a spring-catch C or other form of fastening to keep the members in a tightly-closed condition. Within the bottom A is set a vessel D, of glass or other uncorrosive material, adapted to retain a cooling-mixture, such as salt and vinegar. Adjacent to this vessel, and preferably above the same, is mounted a cheese-board consisting of the cutting-board E, adapted to support the cheese and allow of cutting slices thereon, and a supporting-plate E', extending outward to rest on brackets or ledges F and provided with holes e, through which the vapor and moisture from the cooling-mixture find exit from the lower compartment to the upper portion of the receptacle and into contact with the cheese. Any convenient support for the cutting-board may be supplied as long as it allows the circulation of the vapor from the cooling-mixture about the cheese.

The material of which the receptacle is composed is preferably metal to facilitate the deposit of moisture on the walls thereof. The cover is kept closed, except when it is required to cut a slice from the cheese therein, whereby the cut surface is preserved in its moist fresh condition.

In order to make a tight joint at the meeting edges of the cover and lower part of the case a rubber or other yielding strip G is supported by a ledge or projection from the case and receives the edge of the cover, thereby making an air-tight joint. In hot weather, however, it may be desired to ventilate the box, and for this purpose a regulated opening is provided at the lower portion of the case at H and a corresponding opening at the opposite upper portion at I. The opening is varied in size at each point by a pivoted blade J or other suitable means, whereby the air entering at the lower opening in suitable quantities will pass over the cooling-mixture and about the cheese to the exit-opening at I.

In some makes of cheese—such as Limburger—the consistency of the cheese is such as to cause it to flatten out unless retained by some support at its sides. To adapt my device to this make of cheese I provide a former or side support K, hinged or otherwise secured to the cheese-board, and preferably having a turned-over edge L to stiffen the same. A slight inclination or draft is given to the sides of the former, whereby it may be readily raised from contact with the cheese when it is desired to cut a slice therefrom. In order to support the freshly-cut surface I provide a stop-plate or adjustable partition O, slidingly mounted in said former, preferably by turned-over portions forming eyes P, engaging the sides of said former, as shown in Fig. 6. This stop-plate may thus be slid up against the freshly-cut surface of the cheese and secured by a dog or detent Q, mounted between lugs R or otherwise on said plate. If desired, a spring S will facilitate the engagement of the pawl with the cutting-board. Thus it will be seen that a suitable portion of a cheese being cut and placed on the cutting-board E within the receptacle will be kept cool and moist and preserved in its freshly-cut condition by the cooling-mixture and the inclosing case until the final remnant is used up; also, that special makes of cheese of softer consistency than usual may be retained in their desired shape and size by the side supports above described. Furthermore, it will readily be seen that the shape of the receptacle may be other than rectangular without departing from the spirit of my invention, and that while specially adapted to be made in smaller sizes for household use my device may be made of any size suitable for the reception, preservation, cooling, and moistening of the cheese.

The cooling-mixture contained in the vessel D may be easily renewed by lifting out the said vessel after removing the cheese-board.

While other mixtures may be employed in place of the one described, the simplicity and convenience of the constituents recommend it for common use.

I do not wish to limit myself to the exact form and construction of the parts hereinbefore illustrated and described as long as the functions as above exemplified are carried out.

Having thus fully described my invention, what I claim as new, and desire to secure by Letters Patent, is—

1. In a cheese-box, the combination, with an inclosing case adapted to be opened along a certain line of severance and receptacle therein for a moistening-liquid, of a cutting-board supported above said receptacle and allowing the moisture from said liquid to rise about the same, and a side support for the cheese detachably mounted on said cutting-board and adapted to be lifted from said board and cheese to allow of cutting a slice therefrom, whereby the cheese is kept in a moist condition and retained at its sides from spreading out.

2. The combination, with an inclosing case, the lower portion adapted to contain a moistening-liquid and the upper portion to be lifted therefrom, of a cutting-board supported at the line of severance of said case, a cheese-support consisting of side pieces open at the top and hinged to said board, the dimensions of said side supports increasing from the top downward to facilitate lifting the same from the cheese on said board, and an adjustable partition between said side supports, whereby all sides of the cheese but one are retained by said side supports and the remaining side is retained by said adjustable partition, thereby allowing of cutting a slice from the cheese and setting the partition up to retain the newly-cut surface from spreading.

3. In a cheese-box, the combination, with a former or side support having inclined sides to facilitate withdrawal from the cheese, of a cross-partition or stop-plate having its ends bent over to engage with the edges of said former and slidingly adjustable thereon and a pawl or detent pivoted to said partition or plate and adapted to secure the same in its adjusted position against the pressure of the cheese thereon.

In testimony whereof I affix my signature in presence of two witnesses.

JOSEPH GRIEB.

Witnesses:
H. M. PLAISTED,
ALEX. C. WISEMAN.